United States Patent [19]
Yaniv

[11] Patent Number: 5,630,861
[45] Date of Patent: May 20, 1997

[54] CONTROLLED RELEASE FERTILIZERS

[75] Inventor: Itzhak Yaniv, Beer Sheva, Israel

[73] Assignee: Baran Advanced Materials (94) Ltd., Haifa, Israel

[21] Appl. No.: 331,324

[22] Filed: Oct. 28, 1994

[30] Foreign Application Priority Data

Jul. 7, 1994 [IL] Israel ......................... 110241

[51] Int. Cl.$^6$ ................. C05C 9/00; C05B 7/00; C05G 3/00
[52] U.S. Cl. .................. 71/28; 71/33; 71/64.07; 71/64.11
[58] Field of Search .............. 71/1, 11, 27, 28, 71/33, 61, 62, 63, 64.07, 64.11

[56] References Cited

U.S. PATENT DOCUMENTS

| | | | |
|---|---|---|---|
| 2,702,753 | 2/1955 | Dickey | 106/661 |
| 3,969,453 | 7/1976 | Thompson | 264/42 |
| 4,041,929 | 8/1977 | Cooksey | 126/536 |
| 4,123,392 | 10/1978 | Hall | 252/478 |
| 4,174,420 | 11/1979 | Anolick | 428/290 |
| 4,699,822 | 10/1987 | Shu | 428/198 |
| 4,786,328 | 11/1988 | Weill et al. | 106/691 |
| 4,814,014 | 3/1989 | Arfaei | 106/724 |
| 4,992,481 | 2/1991 | von Bonin et al. | 521/54 |
| 5,264,017 | 11/1993 | Van de Walle | 71/61 |

FOREIGN PATENT DOCUMENTS

| | | |
|---|---|---|
| 1992 | 5/1979 | European Pat. Off. . |
| 454660 | 10/1991 | European Pat. Off. . |
| 2810180 | 9/1979 | Germany . |
| 145015 | 11/1980 | Germany . |
| 55-140747 | 5/1980 | Japan . |
| 58-208159 | 12/1983 | Japan . |
| 1590384 | 6/1981 | United Kingdom . |
| WO91/09093 | 6/1991 | WIPO . |

OTHER PUBLICATIONS

Rossiter et al., *Insulation Materials Testing and Applications* (McElroy and Kimpflen, eds., Philadelphia 1990) 38–51 No Month.

Beaudoin et al., *Am. Cer. Soc. Bull.*, 56(4), 424–7 (1977). No Month.

CA 72(20):103399c., Bochorov, Water Resistant Magnesia Cement Based on Caustic Dolomite.

Ved et al., *Budivelni Mater. Konstr.*, (1), 35–6 (1969). No Month.

Stanboliev et al., *Tonindustrie Zeitung*, 100(1), 34–37 (1976). No Month.

*Primary Examiner*—Ferris Lander

[57] ABSTRACT

Controlled-release fertilizers comprise one or more water-soluble fertilizer(s) together with improved magnesite cements, comprising cements selected from magnesium oxychloride and/or magnesium oxysulphate together with one or more organic carboxylic acid(s) and/or their carboxylate salts and/or their acid anhydrides.

24 Claims, No Drawings

CONTROLLED RELEASE FERTILIZERS

FIELD OF THE INVENTION

The present invention relates to controlled release water-soluble fertilizers and to methods for their production.

BACKGROUND OF THE INVENTION

The most common solid fertilizers are water-soluble compounds (organic and inorganic compounds, such as urea, potassium sulfate, potassium nitrate, ammonium nitrate, ammonium sulfate, ammonium phosphate, etc.). However, the high solubility of such compounds reduces their efficiency, as they are drained by rain or irrigation water too quickly for the plants to utilize them efficiently. Moreover, the fertilizers lost to the surroundings cause environmental problems (e.g. nitrates poison the drinking water system, phosphates cause eutrophication of rivers and lakes, etc.).

Two general methods were suggested in the art to overcome the above disadvantages, namely:

a. To use substitutes for the said common fertilizers, which are slow-release fertilizers (SRF), such as urea-formaldehyde, oxamide, melamine, etc., which however are much more expensive than the usual fertilizers; and b. To use physically modified SRF, which are prepared by mixing and/or coating and/or encapsulating/microencapsulating the water soluble fertilizers with waxes, sulphur, synthetic polymers, cements (e.g. Portland cement), organic acids, etc. These modifications lead to products of better cost-performances than (a), but which are still not good enough to replace the regular fertilizers in common uses.

The literature deals quite extensively with both the above-mentioned approaches. A general review of slow-release fertilizers SRF (CEH Marketing Research Report—"Controlled Release Fertilizers"; by S. P. Landels with A. leder and N. Takei; 1990 by the Chemical Economics Handbook—SRI International) presents a comprehensive view of the two general methods that were mentioned above. This review supports the view that no technology for the production of SRF is available in the examined art, which could lead to replacement of most of the water-soluble fertilizers in use. Moreover, it is clear from the economical discussion that only very simple production methods and very inexpensive reagents may be used to convert the fertilizers into successful and widespread SRF.

EP 0276179 discloses a method of coating water-soluble fertilizers with water-insoluble metal salts of organic acids containing 6 to 30 carbon atoms. A close examination of this technology shows that it is not useful for practical purposes, as the constituents of the coating, including the paraffin, are too expensive and the whole coating process is too cumbersome and costly.

DE 141519 deals with a technology for preparing SRF sticks for gardening, which are based on a skeleton of sand and calcium aluminate cement. Such products may be used for small scale application in which the cost-effectiveness is not of prime importance, but is not suitable for large scale agricultural and industrial use. U.S. Pat. No. 4,023,955 discloses a method for encapsulating water-soluble fertilizes with hydrated cement. Superficially, this technology looks very promising. However, a close scrutiny reveals the complexity of the operation that is necessary to obtain a useful SRF. Moreover, it requires the use of elastomers which are not necessarily, environmentally friendly or inexpensive. Also, this technology was not in fact implemented to any appreciable extent.

U.S. Pat. No. 5,030,267 describes a technology useful to coat water-soluble fertilizers with specially prepared calcium metasilicate cement, and to turn it into SRF. Indeed, the product is obtained, but the expenses involved in preparing this special cement and the further costs that are associated with the rest of the coating procedure make it impossible to obtain low cost SRF.

DE 145,015 discloses a method for preventing urea from caking on storage by coating it with magnesite cements (oxychloride and oxysulfate). This patent is specific to urea, and does not teach or in any way discloses that this surface-modified urea is also a SRF. Indeed, its product is not a SRF, because the magnesite cements deteriorate quite fast in water and the urea dissolves too rapidly in water. Therefore, this coated urea can not be considered a proper SRF, as will be shown in the examples to follow.

Two Israeli patent applications (Nos. 109825 and 109826) have been filed on May 30, 1994 by the same applicant herein, the specifications of which are incorporated herein by reference. The aforementioned Israeli patent applications describe a method to improve magnesite cements (magnesium oxychloride and/or oxysulfate). This method comprises mixing the following materials: MgO; $MgCl_2$ and/or $MgSO_4$; water; organic carboxylic acid(s) and/or their salts and/or their acid anhydrides. The resulting cements have been found to be of much improved physical properties and most of all—their stability in water changed dramatically. An extensive comparison of the properties of the improved magnesite cements to those of the regular cements is given in the above patent applications.

The outstanding stability of the improved magnesite cements in water makes them extremely suitable for the preparation of SRF, while the regular magnesite cements do not offer such properties and, therefore, are not suitable for that purpose. The examples provided hereinafter will clearly show the marked differences between the SRF made with the improved magnesite cements and those attempted with the regular cements.

It is an object of the present invention to provide controlled-release fertilizers which can be used effectively for large agronomical crops at relatively low cost.

It is another object of this invention to provide a process for converting water-soluble fertilizers into low cost controlled-release fertilizers.

It is still another object of this invention to provide controlled-release fertilizers including suitable fillers—especially the soil in which the controlled-release fertilizers is intended to be used.

It is a further object of this invention to provide improved controlled-release fertilizers comprising flotation reagents that are specific to brine solutions and the particular water-soluble fertilizer.

It is another object of this invention to provide controlled-release fertilizers made of a blend of two or more water-soluble fertilizers, in the presence of $MgCl_2$ or $MgSO_4$ solutions.

It is an object of this invention to provide improved magnesite cement coatings useful as sequestering agents for heavy metal ions that are deliberately added to the fertilizers to broaden their nutrient value.

It is yet another object of this invention to provide controlled-release fertilizers which are essentially environmentally friendly.

All the above and other characteristics and advantages of the invention will be better understood through the following illustrative and non-limitative description of preferred embodiments.

DETAILED DESCRIPTION OF THE INVENTION

Improved magnesite cements are disclosed in the aforementioned Israeli Patent Application Nos. 109825 and 109826. Basically, these are magnesite cements (magnesium oxychloride and/or oxysulfates) which are produced by mixing MgO, $MgCl_2$ and/or $MgSO_4$, and water in the presence of organic carboxylic and polycarboxylic acids (including their salts and acid anhydride forms).

The said organic carboxylic acid(s) can be described by the formula:

$$R\text{-}(COOH)_n$$

wherein:

n=1 or higher;

R=Null; H; Alkyl (linear or branched; saturated or unsaturated; cyclic or acyclic); Aryl (substituted or unsubstituted); one or more of its carbon or hydrogen atoms may be replaced by oxygen, nitrogen, phosphor or sulfur atoms.

Of course, each acid may be substituted by the corresponding acid anhydride or by its carboxylate salts. Illustrative but non-limitative salts are the $Na^+$, $Mg^{++}$ and $Ca^{++}$ salts.

Polycarboxylic acids (salts and anhydrides) can be used to produce the improved magnesite cements for the controlled-release fertilizers, but such polymers can also be produced in situ when using suitable monomers like acrylic acid. To enhance the polymerization suitable polymerization-initiators like sodium perborate can be added.

Naturally, these cements may contain a variety of fillers, which are quite common in the art of cement production (e.g. sand, soil, coal, active carbon, fly-ashes, etc.). According to a preferred embodiment the Acidic Fly-Ash contains about 35%–55% by weight of $SiO_2$, about 15%–32% of $Al_2O_3$ no more than 15% by weight of CaO, and has an LOI (1000° C.) greater than 2.5 wt %.

The fillers further improve the performance of the cements, their setting time, reduce the cost of the formulations and assist in getting the most suitable combination for the various soils. This may further improve the cost/performance of the controlled-release fertilizer and reduce the foreign elements that are being added to the specific environments.

In many cases heavy metal ions are added to the fertilizers to improve the nutrient quality of the products. These ions may be drained to the water system and contaminate it. Usually the heavy metal ions (micro-nutrients) are sequestered to expensive compounds to alleviate this phenomenon. Due to the fact that the improved magnesite cements are excellent complexants for such metal ions, it is possible to blend the simple heavy metal salts into the water-soluble fertilizer and to protect the whole formulation with these cements.

In some cases the performance of the controlled-release fertilizer should be further improved to meet some specific standards. This can be done, among other methods, by precoating the water-soluble fertilizer with small amounts of flotation agents that adhere to the surface of the fertilizer(s) and turn them hydrophobic. Alternatively, the water-soluble fertilizer can be precoated by using a dilute solution of the flotation agents in brine. The suitable flotation agents may be selected by simple test tube flotation experiments, which are well known those skilled in the art ( "Tests For Flotability"—E. J. Pryor; Mineral Processing; Elsevier Publishing Co. Ltd; Third Ed.; pp 463–468 (1965)). Thereafter, the precoated water-soluble fertilizer may be treated regularly to form the improved magnesite cement coatings.

IL 109825 and 109826 also cover shapable compositions comprising a cement of the type described above. Such shapable compositions are useful in manufacturing formed bodies. Illustrative formed bodies comprising a cement which has hardened include cast articles, structural elements, pressed articles, injected articles, extruded articles, and articles in pelletized form or in granulated form (i.e., compacted, crushed and sieved to the fight size distribution).

The methods used to apply the improved magnesite cements are similar to those known in the art of producing fertilizers and more. Mixing of the water-soluble fertilizers with the improved cements, using high shear mixers, gives rise to high viscosity mass that can be extruded, casted, pressed or pelletized to any desired shape or size. After a short curing at ambient temperature the product can be further crushed and sieved to obtain other desired physical forms of the controlled-release fertilizer. Moreover, it is possible to prepare the controlled-release fertilizer by spraying the surface of the water-soluble fertilizer with suitable carboxylic acid(s) and brine. The wet surface can then be dusted with MgO powder to form the improved cements in situ. Repetition of this operation may allow a better control over the dissolution of the fertilizers, though it is not mandatory in most cases. The use of flotation agents to inprove the products can be exploited as well.

In one embodiment of the invention, the improved magnesite cements are prepared separately and then applied by mixing or coating or encapsulating or microencapsulating operations, to form the final product. In a still preferred embodiment of the invention, the improved magnesite cements are applied on top of precoated fertilizers.

According to another preferred embodiment of the invention, the improved magnesite cements are prepared in situ on the surface of the water soluble fertilizers or on precoated ones.

The use of mixtures of fertilizers, e.g. NPK fertilizers, is well known in the art. The present invention permits to formulate single- and multi-component controlled-release fertilizers in manners that are known in the art, including the In-Situ mode of operation that results from the fact that the magnesite cements are produced from, basically, two elements which interact to form the final coating. The curing time is very short at ambient temperature, which gives rise to exceedingly high production rates and therefore to low production costs. Moreover, it was found that mixing e.g. urea and $KNO_3$ and/or $K2SO_4$ and/or KCl in the presence of brine solutions of $MgSO_4$ and/or MgCl gives rise to new combinations the nature of which is not yet known.

Experimental

Illustrative raw materials are as follows:

—calcined MgO, a product of Dead Sea Periclase (MgP);

—calcined MgO, a product of Gregician Magnesite;

—grade "Normal F"—"MgF";

—grade "Normal K" —"Mgk";

—$MgSO_4$ solution having a density of d=1.2 g/cm³ were the ratio $H_2O/MgSO_4$—3.1.

—$MgCl_2$ solution having a density of $d=1.267-1.27$ g/cm$^3$ were the ratio $H_2O/MgCl_2=2.61$.

—Acidic Fly-Ash (AFA) from Hadera power station (contains the major constituents: 50% wt $SiO_2$, 25% wt $Al_2O_3$, 9% wt CaO).

The purity of the various raw materials to be used is not of prime importance. Regular commercial materials are well suited for most applications regarding the production and use of the controlled-release fertilizers.

|  | Types of fertilizers |
|---|---|
| Urea | -U |
| $KNO_3$ | -KN |
| $K_2SO_4$ | -KS |
| Mono ammonium Phsphate | -MAP |
| Di ammonium phosphate | -DAP |
| KCl | -KCl |
| $NH_4NO_3$ | -NN |
| $(NH_4)_2SO_4$ | -NS |
| $MAP + K_2SO_4 +$ Urea | -N.P.K.-1 |
| $MAP + K_2SO_4$ | -N.P.K.-2 |
| $K_2SO_4 +$ Urea | -K.N.-1 |
| KCl + Urea | -K.N.-2 |
| $K_2SO_4 + NH_4NO_3$ | -K.N.-3 |

Abbreviations

"C.M"—carboxylic material, acid, salts or anhydride

"W.L."—weight loss

"F.L."—fertilizer loss by weight

"C"—collector

C 1—cocoamine (Armeen C)

C2—Tallowamine (Armeen T)

C3—Dicocoamine (Armeen 2C)

C4—N-coco-1,3-diaminopropane (Diomeen-C)

C5—N-Tallow- 1,3-diaminopropane (Dolomeen-T)

C6—Tallowbis(2-Hydroxyethyl)amin—(Ethomeen-TH2)

C7—polyoxylethylene(5) Tallowamine (Ethomeen-TH5)

C8—Tallowamine acetate (Aramac-T)

In the examples below, the following raw materials were specifically used:

Carboxylic Compounds

P1—ethylene acrylic acid copolymer

P3—nitrilotriacetic acid (N.T.A.H$_3$)

P4—ethylenediaminetetracarboxylic acid (EDTA Hu)

P6—DL—malic acid

P10—acrylic acid

P19—gluconic acid

P20—propionic acid

P21—acetic acid

P22—formic acid

P23—Emery 790 (a commercial mixture of fatty acids)

P20-CA—calcium propionate

P21-CA—calcium acetate

| | Cements | | | |
|---|---|---|---|---|
| | % Weight | | | |
| Cement Type | MgO | $MgCl_2$ Brine | $MgSO_4$ Brine | Filler |
| Type A | 24 | — | 36 | 40 |
| Type B | 24 | 36 | — | 40 |
| Type C | 40 | — | 60 | — |

Fillers

"Q"—quartz sand—200 mesh

"Clay"—alumino silicate clay

"A.F.A."—Acidic Fly Ash

"G"—graphite or fine coal

C.M.

In all tests C.M. concentration was 60 weight %, based on MgO.

General Procedure

The raw materials in the desired amounts were introduced in a Lab. Retch Mill type KM-1 and subjected to a grinding/mixing operation for a period of up to 3 minutes. A viscous mass was thus produced, which was introduced into pelletizing pan in order to form spherical pellets, and were 1–10% by weight of fine MgO powder were added in order to avoid agglomeration between the pellets.

The pellets were cured at room temperature for seven days and later on were evaluated according to the procedure described hereinafter.

Test Procedure: Seven-day dissolution

Particles (pellets) of the size of −3+0.5 mm were immersed in water at ambient temperature (i.e., 20°–30° C.) for seven days. The weight ratio of fertilizer/water was 5. The materials were dried overnight at 70° C. before and after dissolution and weight loss of fertilizer was measured.

Example 1—Comparative

Various controlled-release fertilizers based on regular magnesite cements "A" and "B", including different fillers, were prepared and tested according to procedure 1. The results are given in Table I below.

TABLE I

| Test No. | Type of Cement | Type of Filler | Type of Fertilizer | % WEIGHT | | 7 DAYS | |
|---|---|---|---|---|---|---|---|
| | | | | Cement | Fertilizer | % W.L. | % F.L. |
| 1 | B | Q | U | 17.0 | 83.0 | 67.0 | 80.7 |
| 2 | A | Q | U | 17.0 | 83.0 | 70.0 | 84.3 |
| 3 | B | AFA | U | 20.0 | 80.0 | 62.5 | 78.1 |

TABLE I-continued

| Test No. | Type of Cement | Type of Filler | Type of Fertilizer | % WEIGHT Cement | % WEIGHT Fertilizer | 7 DAYS % W.L. | 7 DAYS % F.L |
|---|---|---|---|---|---|---|---|
| 4 | A | clay | U | 20.0 | 80.0 | 65.5 | 81.8 |
| 5 | B | Q | KN | 18.0 | 82.0 | 72.0 | 87.8 |
| 6 | A | Q | KN | 20.0 | 80.0 | 65.0 | 81.2 |
| 7 | B | AFA | KN | 19.0 | 81.0 | 66.0 | 81.5 |
| 8 | A | clay | KN | 20.0 | 80.0 | 62.0 | 77.5 |
| 9 | B | Q | KS | 15.0 | 85.0 | 42.0 | 49.4 |
| 10 | A | Q | KS | 15.0 | 85.0 | 38.0 | 44.7 |
| 11 | B | AFA | KS | 19.0 | 81.0 | 32.0 | 39.5 |
| 12 | B | Q | MAP | 19.0 | 81.0 | 40.0 | 49.4 |
| 13 | A | Q | MAP | 19.0 | 81.0 | 50.0 | 61.7 |
| 14 | B | Q | NS | 20.0 | 80.0 | 50.0 | 62.5 |
| 15 | A | Q | NN | 20.0 | 80.0 | 65.0 | 81.2 |
| 16 | B | Q | KCl | 17.0 | 83.0 | 60.0 | 72.3 |
| 17 | A | Q | KCl | 17.0 | 83.0 | 62.0 | 74.7 |
| 18 | B | Q | KN-1 | 15.0 | 85.0 | 45.0 | 52.9 |

The results show that by using regular magnesite cement one can improve somewhat the release pattern of the fertilizers. However, the rate of dissolution is relatively high with respect to other "S.R.F." such as S.C.U. which may lose up to 30% of the fertilizer during the same period (seven days).

EXAMPLE 2

Surface Modification of Fertilizer Mixed with Regular Cement (Encapsulation)

Flotability tests of various fertilizers immersed in $MgCl_2$ and $MgSO_4$ brine were conducted. The tests were conducted according to the principles of flotability test as described in the aforementioned book by E. J. Pryor.

The following collectors were found to be excellent surface modifiers.

TABLE II

| Type of Brine | Type of Fertilizer | Collector | Collector modifier |
|---|---|---|---|
| $MgCl_2$ | U | C2 | |
| $MgCl_2$ | U | C4 | $Al_2(SO_4)_3$ |
| $MgCl_2$ | U | C5 | $Al_2(SO_4)_3$ |
| $MgCl_2$ | KN | C8 | |
| $MgCl_2$ | KN | C1 | |
| $MgCl_2$ | KN | C3 | |
| $MgCl_2$ | KS | C1 | |
| $MgCl_2$ | KS | C7 | |
| $MgCl_2$ | MAP | C6 | |
| $MgSO_4$ | U | C4 | $Al_2(SO_4)_3$ |
| $MgSO_4$ | KN | C1 | |
| $MgSO_4$ | KS | C1 | |

Accordingly, various slow-release fertilizers were prepared as follows:

—mixing the proper brine with the proper collector in a conditioning tank. The dosage of the collector in the brine is at the range of few hundreds to few thousands ppm, as is customary in flotation processes. The collectors dosages in the experiments ( Tables III and V ) were kept at the value of 2000 ppm.

—Preparing the slow-release fertilizer by introducing to the high shear mixer the modified brine, MgO, fertilizer and the cement filler.

After preparation, the products were tested according to the test procedure, as given in the Table III below.

TABLE III

| Test No. | Type of Cement | Type of Filler | Type of Fertilizer | Type of Collector | % Weight Cement | % Weight Fertilizer | 7 Days % WL | 7 Days % FL |
|---|---|---|---|---|---|---|---|---|
| 19 | B | AFA | U | C2 | 20.0 | 80.0 | 27.0 | 33.7 |
| 20 | B | AFA | KN | C1 | 19.0 | 81.0 | 26.0 | 32.1 |
| 21 | B | Q | KN | C3 | 18.0 | 82.0 | 30.0 | 36.6 |
| 22 | A | Q | KN | C1 | 20.0 | 80.0 | 23.0 | 36.2 |

TABLE III-continued

| Test No. | Type of Cement | Type of Filler | Type of Fertilizer | Type of Collector | % Weight Cement | % Weight Fertilizer | 7 Days % WL | 7 Days % FL |
|---|---|---|---|---|---|---|---|---|
| 23 | B | Q | KS | C1 | 15.0 | 85.0 | 26.0 | 30.5 |
| 24 | A | Q | KS | C7 | 20.0 | 80.0 | 21.0 | 26.2 |
| 25 | B | Q | MAP | C6 | 20.0 | 80.0 | 29.0 | 36.2 |

EXAMPLE 3

Using Improved Magnesite Cement for the Manufacture of Slow-Release Fertilizers (Encapsulation)

The improved magnesite cement is as defined above, and with reference to IL 109825 and IL 109826.

Various slow-release fertilizers were prepared by mixing the improved cement with various fertilizers and with different fillers. The materials were prepared and tested according to the test procedure, as given Table IV below.

TABLE IV

| Test No. | Type of Cement | Type of Filler | Type and composition of Fertilizer | Type of C.M. | % Weight Cement | % Weight Fertilizer | 7 Days % WL | 7 Days % FL |
|---|---|---|---|---|---|---|---|---|
| 26 | A | Q | KN-1 92% KS 8% U | P-3 | 20.0 | 80.0 | 23.0 | 28.7 |
| 27 | A | Q | MAP | P-3 | 20.0 | 80.0 | 24.0 | 30.0 |
| 28 | A | Q | NPK-1, 40%- MAP, 30% U, 30% KS | P-4 | 18.0 | 82.0 | 26.0 | 31.7 |
| 29 | B | Clay | NPK-1, 40%- MAP, 30% U, 30% KS | P-6 | 16.0 | 84.0 | 25.0 | 29.7 |
| 30 | B | Q | NPK-1 40% MAP, 30% U, 30% KS | P-19 | 17.0 | 83.0 | 24.0 | 28.9 |

EXAMPLE 4

Using Fertilizer Surface Structure Modification for Encapsulation and Improved Magnesite Cement for Coating in Order to Manufacture Slow-Release Fertilizers The slow-release fertilizers were prepared by manufacturing pellets composed of regular cement and surface modified fertilizer as described in Example 2. During pelletization process coating takes place by spraying a solution which is a mixture of the brine and the "CM", as well as spreading simultaneously powder of MgO and the proper filler, so the improved cement is formed in situ at the pellet surface. Additional weight of the pellets due to the coating is varied between 5 to 15% (W).

The samples were prepared and tested according to the test procedure, as given in Table V below.

TABLE V

| Test No. | Type Cement | Type Filler | Type and Comp. of Fertiliz. | Type Collect. | C.M in Coating | % Weight Cement (Encaps. + coating) | Fertiliz. | 7 Days % W.L. | 7 Days % F.L. |
|---|---|---|---|---|---|---|---|---|---|
| 31 | B | AFA | U | C4 | P-21 | 20.0 | 80.0 | 8.1 | 10.1 |
| 32 | A | Q | U | C4 | P-21 | 20.0 | 80.0 | 16.5 | 20.6 |
| 33 | A | Q | KN | C8 | P-21 | 22.0 | 78.0 | 18.0 | 23.0 |
| 34 | B | Q | KS | C7 | P-21 | 20.0 | 80.0 | 18.0 | 22.5 |
| 35 | B | Q | KN-1 U-30%, KS-70% | C4 | P-21 | 20.0 | 80.0 | 16.0 | 20.0 |
| 36 | B | Q | MAP | C6 | P-21 | 20.0 | 80.0 | 6.9 | 8.6 |
| 37 | B | Q | KS | C7 | P-1 | 20.0 | 80.0 | 15.0 | 18.8 |

EXAMPLE 5

Encapsulated and Coated Materials Using Only Improved Cements

Slow-release fertilizers were prepared by using improved cements. The improved cements served as an additive via the mixing stage (i.e., encapsulation) and at the pelletization stage (i.e. coating) by spraying a brine and the proper additive as well as MgO powder so a coating film is created in situ.

The samples were prepared and tested according to the test procedure as shown in Table VI below.

wherein:

n=1 or higher;

R=—COOH; H; Alkyl (linear or branched; saturated or unsaturated; cyclic or acyclic); Aryl (substituted or unsubstituted); and wherein one or more of said Alkyl or Aryl carbon or hydrogen atoms may optionally be replaced by oxygen, nitrogen, phosphor or sulfur atoms.

TABLE VI

| Test No. | Type Cement | Type Filler | Type and Comp. of Fertiliz. | Type of CM for Encaps. | Type of CM for Coating | % Weight Cement (Encaps. + coating) | Fertiliz. | 7 Days % W.L. | 7 Days % F.L. |
|---|---|---|---|---|---|---|---|---|---|
| 38 | B | Q | NP K-2 MAP 70% KS 30% | P4 | P-21 | 20.0 | 80.0 | 3.4 | 4.25 |
| 39 | A | Q | *NPK-1 | P4 | P-23 | 20.0 | 80.0 | 3.2 | 4.0 |
| 40 | A | Q | *NPK-1 | P4 | P-21 | 20.0 | 80.0 | 9.6 | 12.0 |
| 41 | B | Q | U | P19 | P21-CA | 20.0 | 80.0 | 18.0 | 22.5 |
| 42 | B | AFA | KN | P20 | P20-CA | 20.0 | 80.0 | 20.0 | 25.0 |
| 43 (1) | C | | U | P20-CA | P20-CA | 12.0 | 88.0 | 15.0 | 17.0 |
| 44 | C | | KN | P20-CA | P20-CA | 12.0 | 88.0 | 18.0 | 20.5 |
| 45 (2) | C | | U | P-10 + NPB | P20-CA | 20.0 | 80.0 | 15.0 | 18.8 |

*NP K-1 = 40% MAP, 30% KS, 30% U
(1) including 2% (w) sulphur as micronutrient.
(2) Sodium perborate tetrahydrate (NPB) [5% (w) based on P-10.]

All the above description and examples have been given for the purpose of illustration, and are not intended to limit the invention. Many modifications can be made in the various components, manufacturing methods and uses, all without exceeding the scope of the invention.

I claim:

1. Controlled-release fertilizers comprising a mixture of:
   (a) one or more water-soluble fertilizer(s); and
   (b) a magnesite cement cured from a composition comprising magnesium oxychloride, or magnesium oxysulphate, or mixtures thereof, and one or more organic carboxylic acid(s), or carboxylate salts thereof, or acid anhydrides thereof, or mixtures thereof.

2. Controlled-release fertilizers according to claim 1, wherein said carboxylic acid(s) have the formula:

3. Controlled-release fertilizers according to claim 1 or 2, wherein said carboxylic acids comprise polymeric polycarboxylic acids.

4. Controlled-release fertilizers according to claim 3, wherein said polymeric polycarboxylic acids are polymerized in situ from one or more polymerizable organic carboxylic acids or acid anhydrides thereof, or carboxylate salts thereof with a polymerization initiator.

5. Controlled release fertilizers according to claim 1, wherein said magnesite cement is cured from a composition comprising one or more organic carboxylic acids.

6. Controlled-release fertilizers according to claim 1, wherein said cement is cured from a composition comprising one or more organic carboxylic acid anhydrides or organic carboxylic acid carboxylate salts.

7. Controlled-release fertilizers according to claim 1 wherein said water-soluble fertilizers are selected from the group consisting of urea, ammonium nitrate, potassium nitrate, ammonium sulfate, potassium sulfate, potassium chloride, mono ammonium phosphate (MAP) and diammonium phosphate (DAP).

8. Controlled-release fertilizers according to claim 7, in which the mixtures of the water-soluble fertilizer that interacted in brine solutions are selected from among: urea and potassium sulfate; urea and potassium chloride; urea and potassium nitrate.

9. Controlled-release fertilizers according to claim 1, wherein said magnesite cement is prepared from brine solutions of $MgCl_2$, or $MgSO_4$, or mixtures thereof.

10. Controlled-release fertilizers according to claim 1, further incorporating suitable flotation agents.

11. A method of manufacturing a controlled-release fertilizer as claimed in claim 1, wherein water-soluble fertilizer crystals are encapsulated or microencapsulated with said magnesite cement.

12. A method according to claim 11, wherein the encapsulated/microencapsulated water-soluble fertilizer are further agglomerated.

13. A method according to claim 12, wherein the agglomerates are further coated with the improved magnesite cements.

14. A method according to claim 11, wherein said fertilizer is coated by one or more layer(s) of said magnesite cement.

15. A method according to claim 11, wherein said cement is cured separately and then applied by mixing or coating or encapsulating or microencapsulating said fertilizer.

16. A method according to claim 15, wherein said magnesite cement is applied on top of precoated fertilizers.

17. A method according to claim 11, wherein said controlled-release fertilizer is prepared by curing said magnesite cement in situ on the surface of said water soluble fertilizers or on precoated ones.

18. A method of manufacturing controlled-release fertilizers as claimed in claim 1, wherein said water-soluble fertilizer(s) are mixed with said magnesite cememt to form a mixture of said fertilizer and said cement.

19. A method according to claim 18, wherein the mixture is casted.

20. A method according to claim 18, wherein the mixture is pressed.

21. A method according to claim 18, wherein the mixture is extruded.

22. A method according to claim 18, wherein the mixture is pelletized.

23. A method according to claim 18, wherein said controlled-release fertilizer is further crushed and sieved to the desired size distribution.

24. A method of manufacturing a controlled-release fertilizers as claimed in claim 10, wherein the flotation agents are spread first directly onto the surface of the water soluble fertilizers, preferably as a dilute solution in the suitable brine.

* * * * *